(12) United States Patent
Sahinoglu et al.

(10) Patent No.: US 7,526,048 B2
(45) Date of Patent: Apr. 28, 2009

(54) ENERGY THRESHOLD SELECTION FOR UWB TOA ESTIMATION

(75) Inventors: Zafer Sahinoglu, Watertown, MA (US); Ismail Guvenc, Somerville, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 623 days.

(21) Appl. No.: 11/202,006

(22) Filed: Aug. 11, 2005

(65) Prior Publication Data

US 2007/0036241 A1    Feb. 15, 2007

(51) Int. Cl.
*H04L 27/00* (2006.01)
(52) U.S. Cl. ...................................... 375/316
(58) Field of Classification Search ................ 375/130, 375/140, 316, 147
See application file for complete search history.

(56) References Cited

U.S. PATENT DOCUMENTS

2006/0017615 A1* 1/2006 Schmid et al. .............. 342/451
2006/0080040 A1* 4/2006 Garczarek et al. ............. 702/19

FOREIGN PATENT DOCUMENTS

WO    WO 2006/112831 A1 * 10/2006
WO    WO 2007/018133 A1 *  2/2007
WO    WO 2008//017033 A1 *  2/2008

OTHER PUBLICATIONS

Shaohua et al., "Match Filtering Based TOA Estimation for IR-UWB Ranging System," IEEE, 2008, pp. 1099-1105.*
R. A. Scholtz and J. Y. Lee, "Problems in modeling UWB channels," in *Proc. IEEE Asilomar Conf. Signals, Sys. Computers*, vol. 1, Monterey, CA, Nov. 2002, pp. 706-711.
I. Guvenc and Z. Sahinoglu, "Threshold-based TOA estimation for impulse radio UWB systems," IEEE Int. Conf. UWB (ICU), Zurich, Switzerland, Sep. 2005, accepted for publication.
Z. Tian and G. B. Giannakis, "A GLRT approach to data-aided timing acquisition in UWB radios—Part I: Algorithms," *IEEE Trans. Wireless Commun.*, 2005 (to appear).
A. F. Molisch, K. Balakrishnan, C. C. Chong, S. Emami, A. Fort, J. Karedal, J. Kunisch, H. Schantz, U. Schuster, and K. Siwiak, "IEEE 802.15.4a channel model—final report," Sep. 2004. [Online]. Available:http://www.ieee802.org/15/pub/TG4a.html.

* cited by examiner

Primary Examiner—Tesfaldet Bocure
(74) Attorney, Agent, or Firm—Dirk Brinkman; Gene Vinokur

(57) ABSTRACT

A method for estimation a time-of-arrival of a radio signal is provided. The signal is an ultra-wideband (UWB) signal. The method uses kurtosis of the received signal to estimate an energy threshold of the signal. The energy threshold can be used to determine a time-of-arrival of the signal.

9 Claims, 6 Drawing Sheets

US 7,526,048 B2

ENERGY THRESHOLD SELECTION FOR UWB TOA ESTIMATION

FIELD OF THE INVENTION

The present invention relates generally to estimating a time-of-arrival (TOA) of a radio signal, and more particularly to selecting an energy threshold for TOA estimation of an ultra-wideband (UWB) signal.

BACKGROUND OF THE INVENTION

Impulse radio ultra-wideband (IR-UWB) enables precise ranging and location estimation due to extremely fast and short duration pulses, e.g., billions of sub-nanosecond pulses per second. Accurate time-of-arrival (TOA) estimation of the received signal is a key aspect for precise ranging. However, received UWB signals can include hundreds of multipath components, which increase the difficulty of TOA estimation.

If a coarse timing estimate is available, then an energy of the received samples can be compared with an energy threshold. The first sample that exceeds the threshold can be used as an estimate of the TOA.

However, it is a problem to select an appropriate threshold. The threshold can be based on received signal statistics, i.e., the signal-to-noise ratio (SNR) or a channel realization. If the selected threshold is based solely on noise variance, then the variance of the noise needs to be determined, Scholtz et al., "Problems in modeling UWB channels," Proc. IEEE Asilomar Conf. Signals, Syst. Computers, vol. 1, pp. 706-711, November 2002.

One method uses a normalized threshold technique that assigns a threshold between minimum and maximum values of energy samples, see U.S. patent application Ser. No. 11/995,394 entitled "Method and Receiver for Identifying a Leading Edge Time Period in a Received Radio Signal" and filed by Molisch et al. on Jan. 11, 2008. However, there are two practical limitations to that method. It is difficult to estimate the SNR, and using only the SNR of the received signal does not account for individual channel realizations. This results in a suboptimal threshold selection.

SUMMARY OF THE INVENTION

The invention provides a method for estimation a time-of-arrival of a radio signal. Particularly, the signal is an ultra-wideband (UWB) signal. The method uses kurtosis of the received signal to estimate an energy threshold.

DETAILED DESCRIPTION OF THE PREFERRED EMBODIMENT

System Structure

Figure 1:
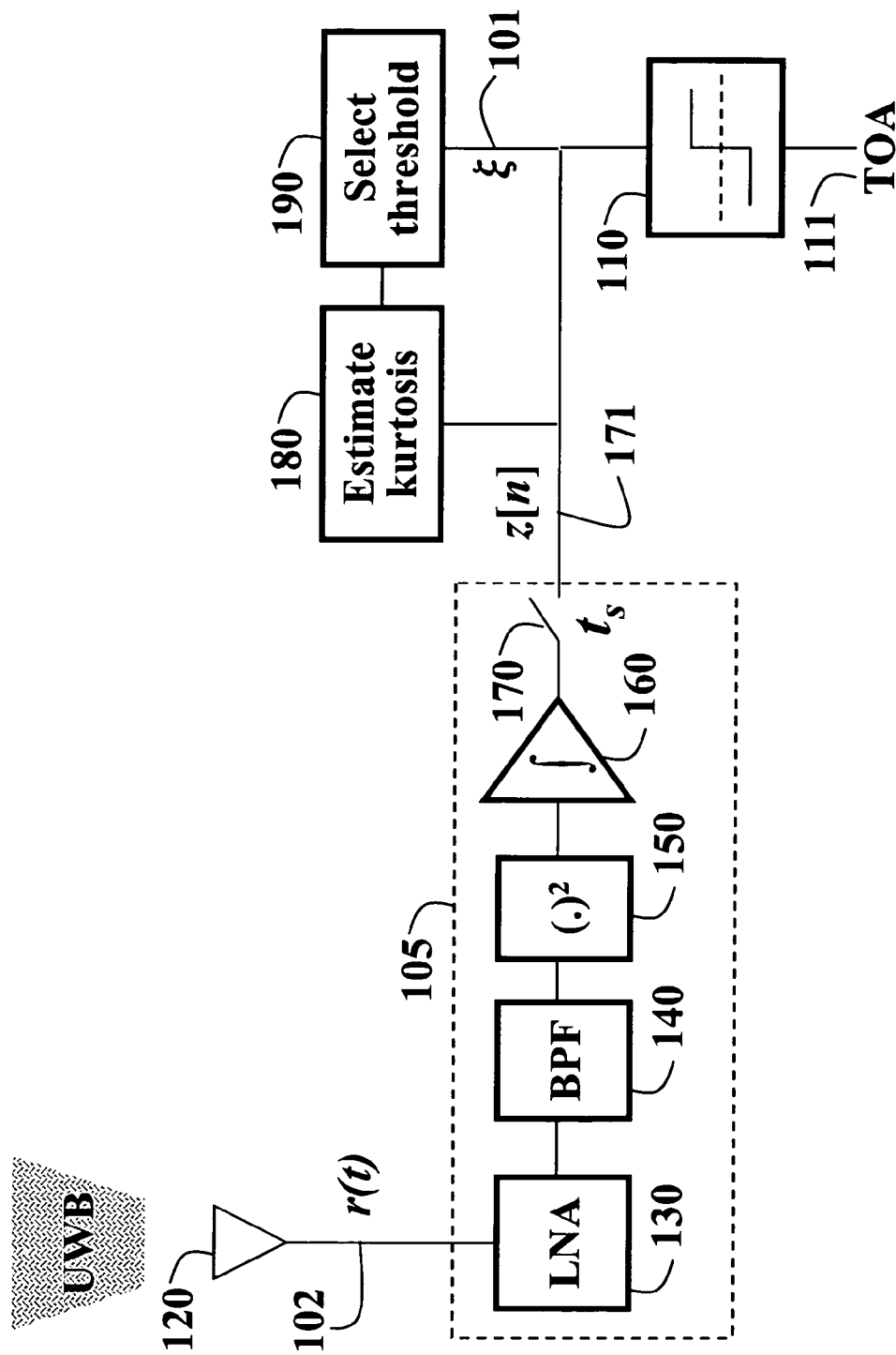
FIG. 1 is a block diagram of a system and method for estimating an energy threshold to be used for estimating the TOA of a UWB signal according to an embodiment of the invention.

FIG. 1 shows a system and method 100 for determining an energy threshold ξ 101 for an ultra-wideband signal 102 according to one embodiment of the invention. The energy threshold 101 can be used for estimating 110 a time-of-arrival (TOA) 111 of a UWB signal 102 at a receiver.

The UWB signal is received at an antenna 120. The signal is preprocessed 105. During the preprocessing, the signal is low noise amplified (LNA) 130, band pass filtered (BPF) 140, squared $(.)^2$ 150, and integrated $\int$ 160. The resulting signal energy is sampled periodically 170 at time intervals $t_s$ to produce samples z[n] 171.

Kurtosis analysis 180 is performed on the samples. Kurtosis measures a degree of peakedness of a distribution of the real-valued random variables z[n] that are the signal samples. The kurtosis can be defined as a ratio of the second and fourth moments of the distribution of the energy in the signal samples. A distribution of normal random variables has a kurtosis of 3. A higher kurtosis means more of the variance is due to infrequent extreme deviations, as opposed to frequent modestly-sized deviations. The kurtosis is used to select 190 the energy threshold ξ 101.

System Model

The received multipath ultra-wideband (UWB) signal 102 can be expressed as $$r(t) = \sum_{j=-\infty}^{\infty} d_j \omega_{mp}(t - jT_f - c_j T_c - \tau_{toa}) + n(t), \quad (1)$$

where j is a frame index, $T_f$ is a frame duration, $T_c$ is the chip duration, and $\tau_{toa}$ is the estimated time-of-arrival (TOA) of the received signal.

An effective pulse after the channel impulse response can be expressed by $$\omega_{mp}(t) = \sqrt{\frac{E_b}{N_s}} \sum_{l=1}^{L} \alpha_l \omega(t - \tau_l),$$

where ω(t) is the received UWB pulse with unit energy, $E_b$ is the symbol energy, $N_s$ represents the number of pulses per symbol, and $\alpha_l$ and $\tau_l$ are the fading coefficients and delays of multipath components, respectively.

Additive white Gaussian noise (AWGN) with zero-mean, double-sided power spectral density $N_0/2$, and variance $\sigma^2$ is denoted by n(t).

To provide processing gain, time-hopping codes $c_j \in \{0, 1, \ldots, N_h-1\}$, and random polarity codes $d_j \in \{\pm 1\}$ are used during transmission, where $N_h$ is the possible number of chip positions per frame, given by $N_h = T_f/T_c$. We assume that a coarse acquisition, on the order of frame-length, is acquired, such that the estimated TOA is $\tau_{toa} \sim U(0, T_f)$, where U (.) denotes a uniform distribution.

For a search region, the signal within time frame $T_f$ and half of the next frame is considered to include interframe leakage due to multipath interference.

The signal, after LNA 130 and BPF 140, is input to the square-law device 150 followed by integration 160 with an integration interval of $T_b$. The integration interval determines the time-wise width of the blocks. The number of samples is denoted by $N_b = \frac{1}{2}(T_f/T_b)$, i.e., a function of frame duration and block size. The sample index is denoted by $n \in \{1, 2, \ldots, N_b\}$, with respect to a starting point of an uncertainty region.

With a sampling interval of $t_s$, which is equal to the block length $T_b$, the sample values 171 are given by $$z[n] = \sum_{j=1}^{N_s} \int_{(j-1)T_f + (c_j + n-1)T_b}^{(j-1)T_f + (c_j + n)T_b} |r(t)|^2 dt, \qquad (2)$$

where the means and variances of noise-only and energy bearing blocks are given by $\mu_0 = M\sigma^2$, $\sigma_0^2 = 2M\sigma^4$, $\mu_e = M\sigma^2 + E_n$, $\sigma_e^2 = 2M\sigma^4 + 4\sigma^2 E_n$, respectively. The degree of freedom M is given by $M = 2BT_b + 1$, $E_n$ is the signal energy within the $n^{th}$ block, and B is the signal bandwidth. The energy of the received symbol is given by $$\sum_{n=n_{toa}}^{n_{toa}+n_{cb}-1} E_n,$$

where $n_{eb}$ is the number of blocks that sweeps the signal samples.

The received samples 171 are compared to the energy threshold 101 during the TOA estimation 110. The time index of the first sample that exceeds the energy threshold can be identified as the TOA estimate 111, i.e., $$\hat{t}_{TC} = [\min\{n | z[n] > \xi\} - 0.5]T_b, \qquad (3)$$

where $\hat{t}_{TC}$ is the threshold crossing time, and $\xi$ is the energy threshold 101 which is based on statistics of the received signal. Given samples with minimum and maximum energy, the following normalized threshold can be used $$\xi_{norm} = \frac{\xi - \min\{z[n]\}}{\max\{z[n]\} - \min\{z[n]\}}. \qquad (4)$$

The norm that minimizes the mean absolute error (MAE) is defined by $E[|\hat{t}_{TC} - \tau_{toa}|]$ for a particular $E_b/N_0$ value, where $E[.]$ denotes an expectation operation.

However, estimation of $E_b/N_0$ for a UWB signal is not trivial. Moreover, the optimal normalized threshold can vary for different channel realizations with the same $E_b/N_0$.

Therefore, it is desired to improve the way that the threshold 101 is selected 190.

Threshold Selection Based on Kurtosis

In the prior art, the kurtosis has been used to estimate the SNR for conventional narrow band radio signals, Matzner et al., "SNR estimation and blind equalization (deconvolution) using the kurtosis," Proc. IEEE-IMS Workshop on Information Theory and Stats., p. 68, October 1994.

Figure 2:
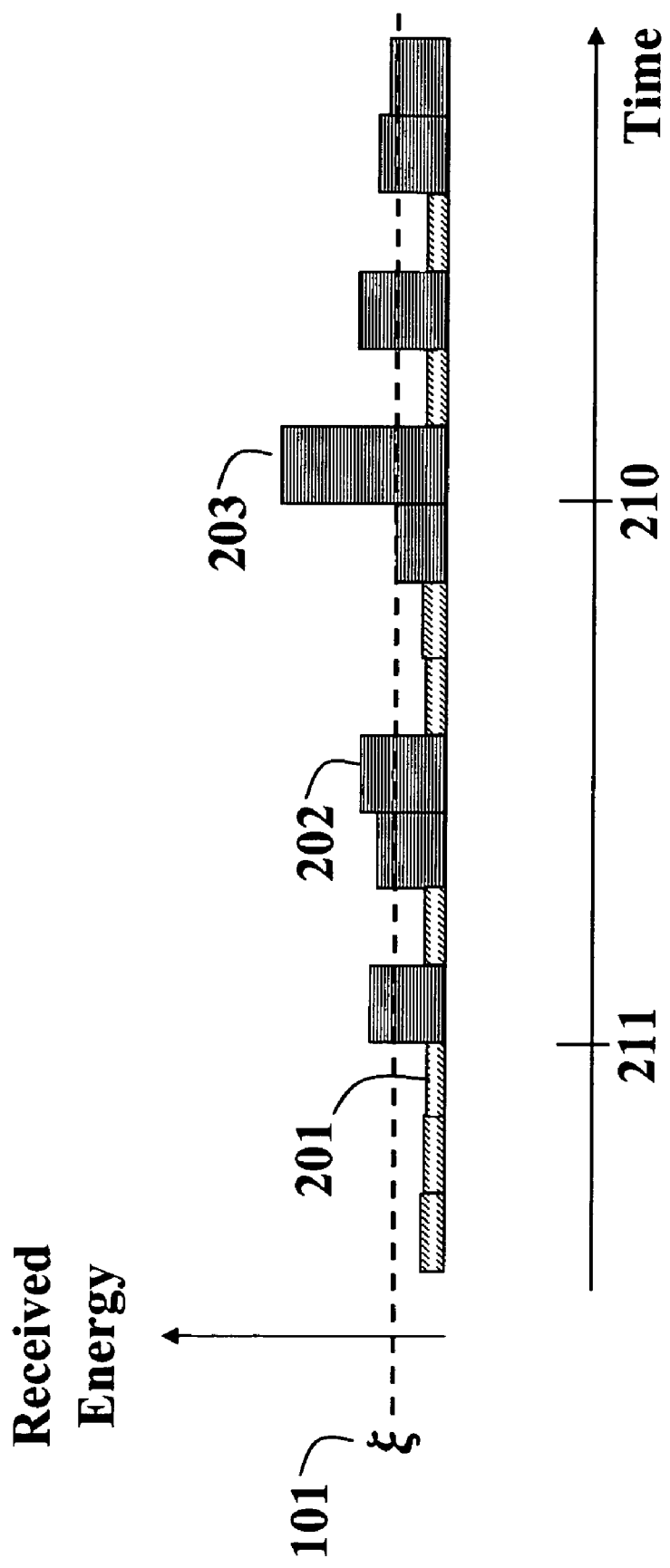
FIG. 2 is a timing diagram of a received energy block of a UWB signal according to an embodiment of the invention.

Kurtosis has not been used to estimate an energy threshold of an ultra-wideband UWB signal with hundreds of multipath components. The problem is partially shown in FIG. 2. In FIG. 2, the blocks 201 are noise, the blocks 202 are energy blocks of the signal, and the block 203 has a peak energy. Prior art techniques typically estimate a TOA 210 based on the peak energy. This can be erroneous. A better TOA estimate would be based on the first energy block exceeding the threshold 211.

According to an embodiment of the invention, the kurtosis of the energy of the received signal samples $z[n]$ 171 is determined using second and fourth order moments, and is expressed as a ratio of the fourth moment to the square of the second moment of the energy of the samples:

$$\kappa(z[n]) = \frac{\varepsilon(z^4[n])}{\varepsilon^2(z^2[n])}, \quad n = 1, 2, \ldots, N_b, \qquad (5)$$

where $\varepsilon(.)$ denotes an expectation operation.

The kurtosis relative to a Gaussian distribution can be defined as $$K(z[n]) = \kappa(z[n]) - 3,$$

which is zero for the Gaussian distribution.

In the absence of a received signal or for a low SNR, and for sufficiently large M, the samples $z[n]$ 171 are Gaussian distributed, yielding $K = 0$. As the SNR increases, the kurtosis tends to increase, and can take different values for the same SNR value.

Figure 3:
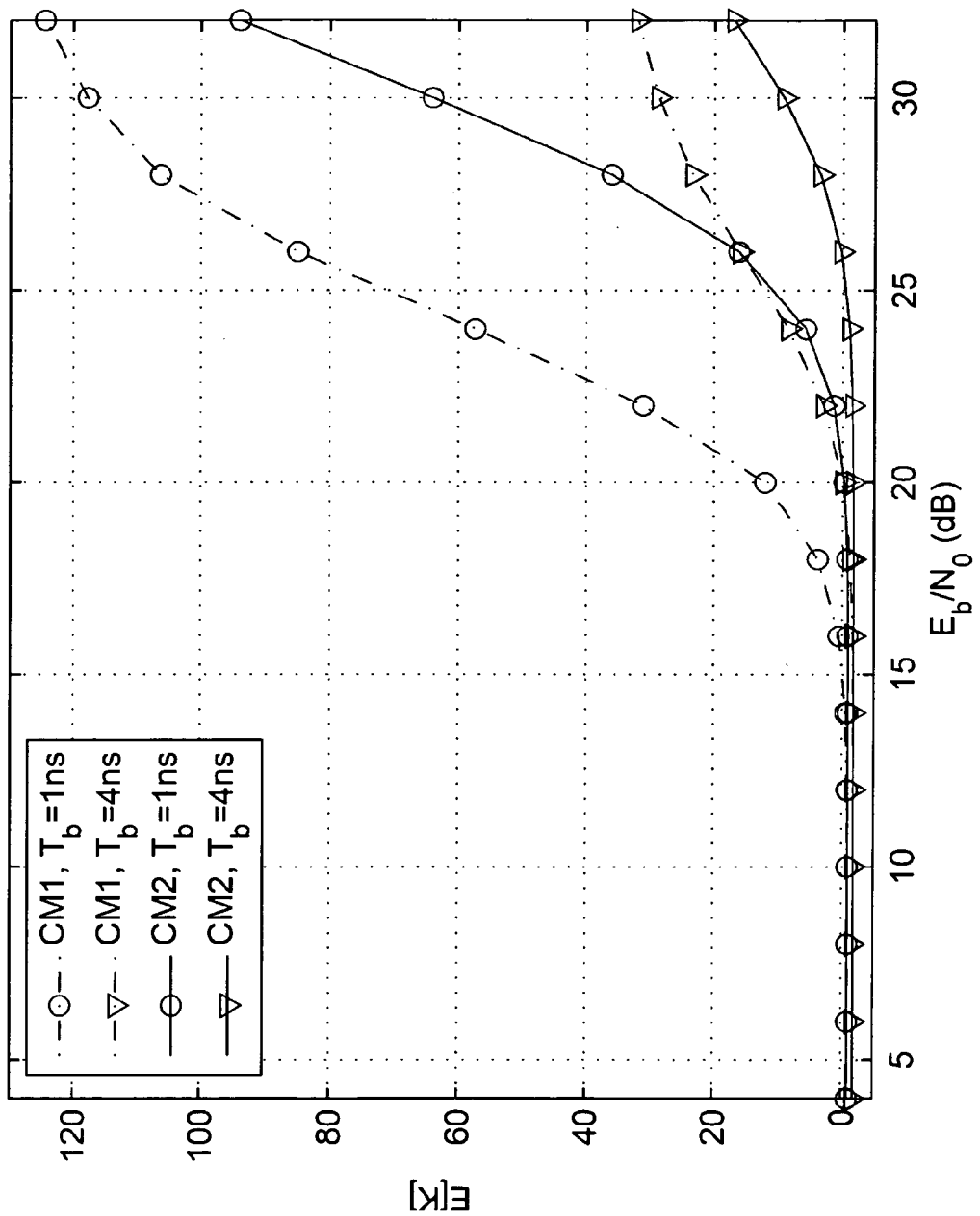
FIG. 3 is a graph of expected values of K with respect to $E_b/N_0$ for different block sizes.

FIG. 3 shows expected values of K with respect to $E_b/N_0$ for different block sizes over CM1 and CM2 channel models according to the IEEE 802.15.4a standard, averaged over 1000 simulated channel realizations, where CM1 is line of sight, <4 m, and CM2 is non-line of sight, <4 m.

The system parameters are $T_f = 200$ ns, $T_c = 1$ ns, B=4 GHz, and $N_s = 1$. The relationship shown in FIG. 3 is an average relationship, and the kurtosis values for individual channel realizations can show deviations depending on the clustering of the multipath components, which also affects the optimality of the threshold for the same $E_b/N_0$ value.

Figure 4:
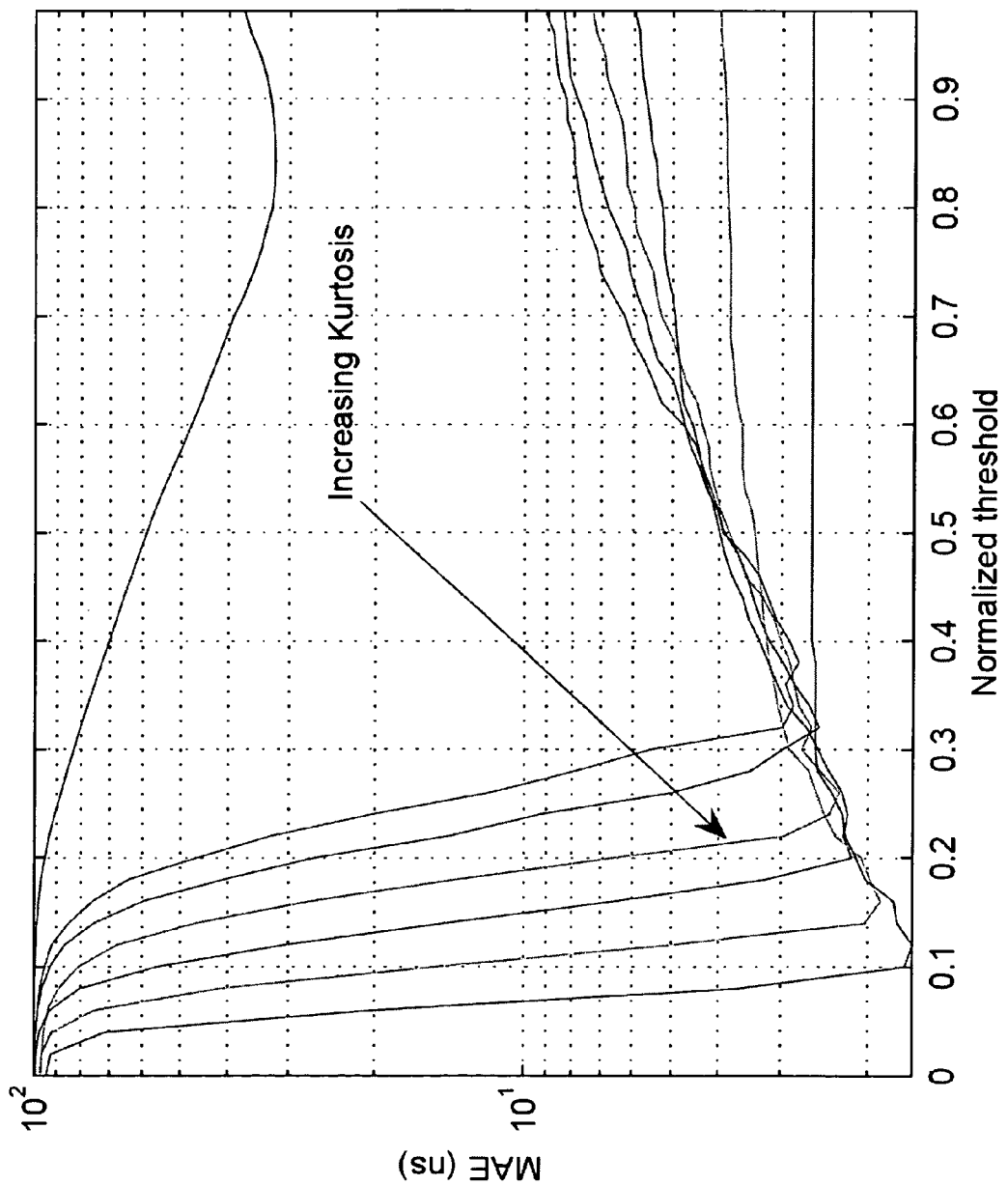
FIG. 4 is a graph of the mean absolute error of TOA estimates with respect to a normalized threshold.

FIG. 4 shows the MAEs of the TOA estimates with respect to a normalized threshold and the kurtosis values rounded to logarithmic integers. The logarithm accounts for the clustering of the kurtosis values at low $E_b/N_0$. The kurtosis values are obtained for 1000 CM1 simulated channel realizations with $E_b/N_0 = \{10, 12, 14, 16, 18, 20, 22, 24, 26\}$dB. The optimal achievable MAE improves with increasing kurtosis values.

Figures 5, 6:
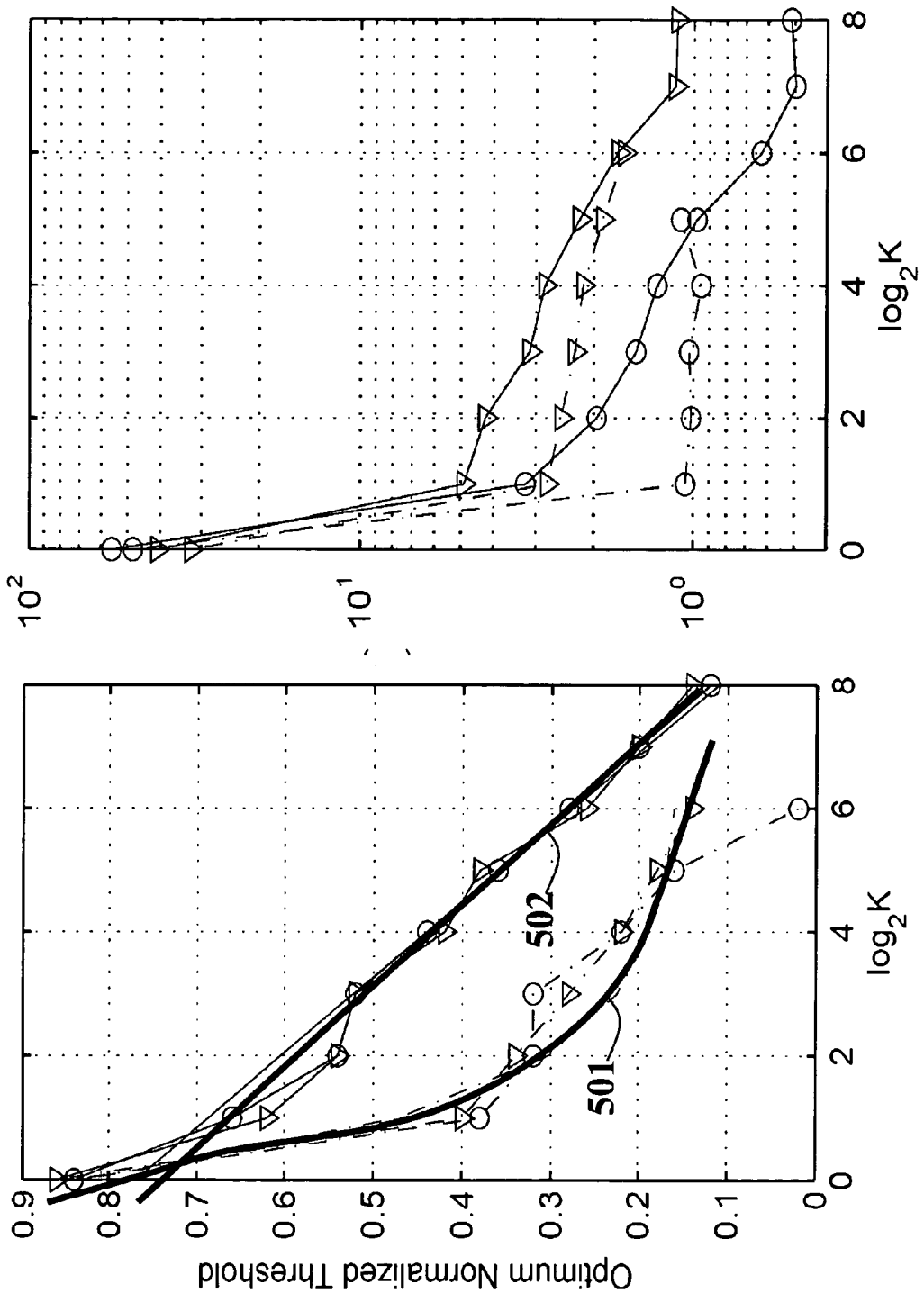
FIG. 5 is a graph of the optimal normalized threshold value with respect to the logarithm of kurtosis.
FIG. 6 is graph of the corresponding mean absolute error for the graph in FIG. 5.

FIGS. 5 and 6 show the optimal normalized threshold value with respect to the logarithm of the kurtosis, and the corresponding MAE, respectively. While the channel model does not much affect the relation between $\xi_{opt}$ and $\log_2 K$, the dependency changes for different block sizes. In order to model the relationship, a double exponential function fit 501 is used for $T_b = 4$ ns, while a linear function fit 502 is used for $T_b = 1$ ns.

Equations 6 and 7 can be used to select the appropriate energy thresholds.

$$\xi_{opt}^{(4ns)} = 0.673 e^{-0.75 \log_2 K} + 0.154 e^{-0.001 \log_2 K}, \qquad (6)$$

$$\xi_{opt}^{(1ns)} = -0.082 \log_2 K + 0.77, \qquad (7)$$

The model coefficients are obtained from the above described relationships for both CM1 and CM2 simulated data, i.e., the same coefficients are used to characterize both channel models.

It should be noted that the above technique can be used to model signals having other block sizes.

In addition, the kurtosis based energy level can also be used as a TOA application using narrow band radio signals.

It should also be noted, that the energy threshold can be used to remove noise. With reference to FIG. 2, all blocks 201 with an energy level less than the threshold ξ can be removed and not be processed any further.

EFFECT OF THE INVENTION

With the kurtosis-based threshold selection as described above, the estimation error can be significantly decreased compared to prior art fixed threshold and SNR based techniques.

Figure 7:
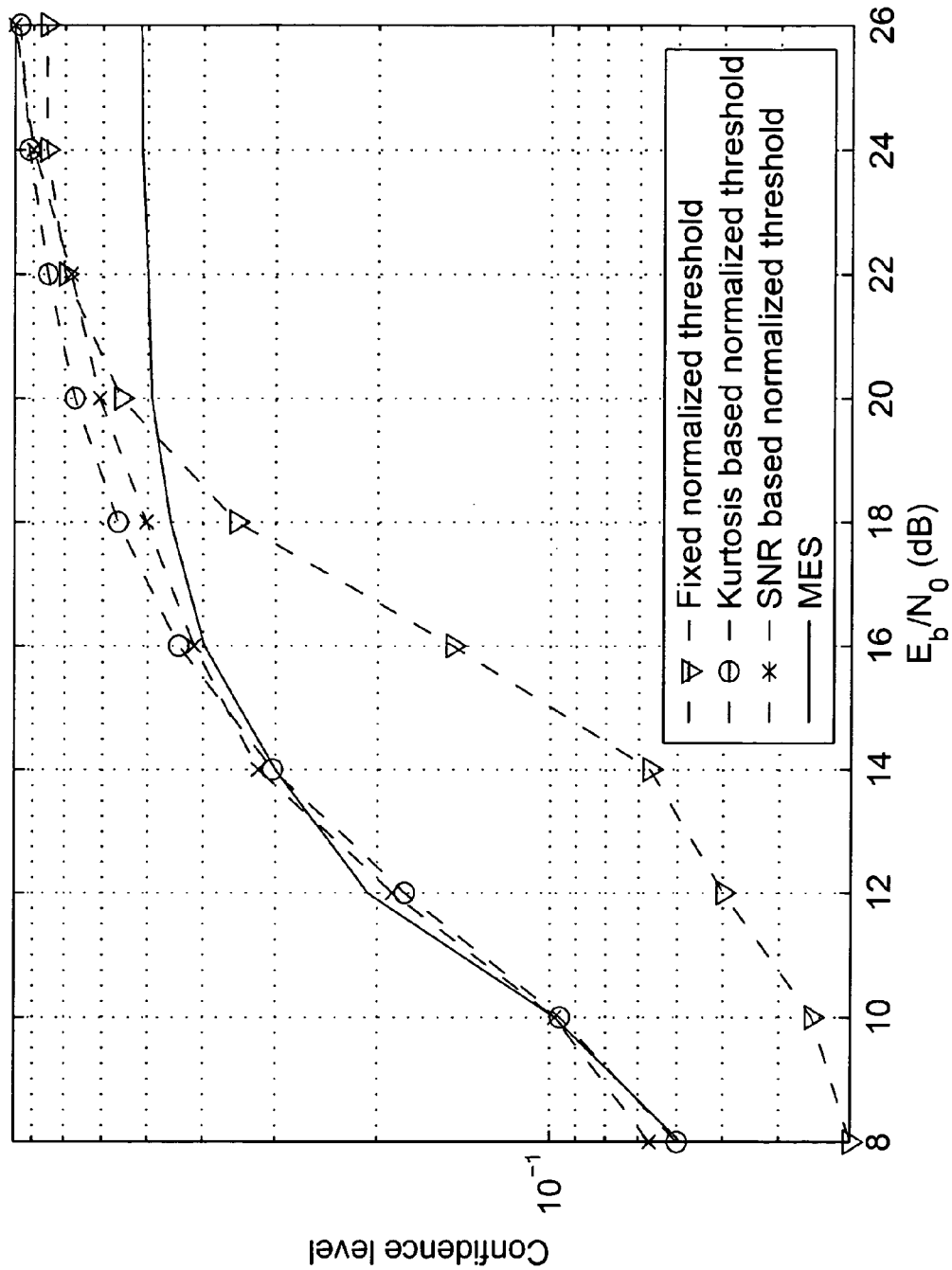
FIG. 7 is a graph of confidence levels for ranging estimation errors.

FIG. 7 shows confidence level for a 3 ns estimation error, i.e., a 90 cm ranging error. If the kurtosis based normalized energy threshold is used, then a 70% confidence level can be achieved at $E_b/N_0$ larger than 22 dB. Better results can be obtained via coherent ranging at lower $E_b/N_0$ values.

The threshold selection method can be implemented by calibrating the system for particular block size and frame duration. The method is independent of the channel model.

Although the invention has been described by the way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for selecting an energy threshold for a radio signal, comprising:
   receiving a radio signal in a radio receiver, in which the radio signal is a wide band signal;
   sampling periodically an energy of the radio signal as samples;
   determining a kurtosis of the energy of the samples, the kurtosis being a ratio of a fourth moment of the signal and a square of a second moment of the signal; and
   selecting an energy threshold based on the kurtosis in a threshold selector.

2. The method of claim 1, in which the radio signal is an impulse radio ultra-wideband signal.

3. The method of claim 1, further comprising:
   determining a time-of-arrival of the radio signal according to the energy threshold.

4. The method of claim 1, further comprising:
   low noise amplifying the radio signal; and then
   band pass filtering the amplified signal; and then
   squaring the filtered signal; and then
   integrating the squared signal; and then
   performing the sampling.

5. The method of claim 1, in which a first sample exceeding the energy threshold indicates a time-of-arrival of the radio signal.

6. The method of claim 1, in which the kurtosis κ of the energy sample z[n] is expressed as a ratio of a fourth moment to a square of a second moment of the energy of the samples according to $$\kappa(z[n]) = \frac{\varepsilon(z^4[n])}{\varepsilon^2(z^2[n])},$$

where $\epsilon(.)$ denotes an expectation operation.

7. The method of claim 1, in which the energy threshold is $$\xi_{opt}^{(4ns)} = 0.673 e^{-0.75 \log_2 K} + 0.154 e^{-0.001 \log_2 K},$$

for 4 ns samples.

8. The method of claim 1, in which the energy threshold is $$\xi_{opt}^{(1ns)} = -0.082 \log_2 K + 0.77,$$

for 1 ns samples.

9. The method of claim 1, further comprising:
   removing samples having an energy less than the threshold to reduce noise in the radio signal.

* * * * *